US007063642B1

(12) United States Patent
Hu et al.

(10) Patent No.: US 7,063,642 B1
(45) Date of Patent: Jun. 20, 2006

(54) NARROW SPEED RANGE DIESEL-POWERED ENGINE SYSTEM W/ AFTERTREATMENT DEVICES

(75) Inventors: Haoran Hu, Novi, MI (US); Thomas Stover, Milford, MI (US); James Edward McCarthy, Jr., Canton, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/246,974

(22) Filed: Oct. 7, 2005

(51) Int. Cl.
*F16H 59/74* (2006.01)
*F01N 3/00* (2006.01)
(52) U.S. Cl. .......................... 477/100; 60/286; 60/295
(58) Field of Classification Search ................ 60/286, 60/295; 477/100
See application file for complete search history.

(56) References Cited

U.S. PATENT DOCUMENTS

| | | | | |
|---|---|---|---|---|
| 5,771,685 | A * | 6/1998 | Hepburn | 60/274 |
| 6,199,372 | B1 * | 3/2001 | Wakamoto | 60/274 |
| 6,298,300 | B1 * | 10/2001 | Ohyama et al. | 701/103 |
| 6,301,529 | B1 * | 10/2001 | Itoyama et al. | 701/22 |
| 6,615,579 | B1 | 9/2003 | Nishiyama | |
| 6,637,198 | B1 * | 10/2003 | Hertzberg | 60/295 |
| 6,672,989 | B1 | 1/2004 | Murata et al. | |
| 6,694,724 | B1 | 2/2004 | Tanaka et al. | |
| 6,823,657 | B1 * | 11/2004 | Waschatz et al. | 60/274 |
| 6,823,843 | B1 | 11/2004 | Goralski, Jr. et al. | |
| 6,829,885 | B1 | 12/2004 | Surnilla et al. | |
| 6,857,265 | B1 * | 2/2005 | Twigg et al. | 60/295 |
| 6,868,669 | B1 | 3/2005 | Tanaka | |
| 6,910,329 | B1 * | 6/2005 | Bunting et al. | 60/297 |
| 6,971,970 | B1 * | 12/2005 | Inoue et al. | 477/97 |
| 6,973,775 | B1 * | 12/2005 | Hoffmann et al. | 60/286 |

* cited by examiner

*Primary Examiner*—Dirk Wright
(74) *Attorney, Agent, or Firm*—Paul V. Keller, LLC

(57) ABSTRACT

One or more parameters for denitration or desulfations of a LNT is varied, whereby the saturation of NOx and/or SOx in the LNT is reduced to a lower level when an operating state makes the LNT otherwise less effective or places a greater demand for conversion efficiency on the LNT. The operating state can relate to whether the LNT is at the limit of its effective operating temperature range, a degree of poisoning, or an engine operating state. Selectively tolerating high degrees of sulfur poisoning or NOx saturation during periods of low exhaust flow allows the efficiency of denitrations and/or desulfations to be increased over a large portion of a vehicle's operating cycle, particularly when the engine uses a CVT. Another concept relates to a power generation system comprising an engine tuned to efficiently operate in a narrow speed range for all levels of power output.

19 Claims, 8 Drawing Sheets

NARROW SPEED RANGE DIESEL-POWERED ENGINE SYSTEM W/ AFTERTREATMENT DEVICES

FIELD OF THE INVENTION

The present invention relates to pollution control systems and methods for diesel engines and lean burn gasoline engines.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches remove NOx from the vehicle exhaust. These include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proved challenging to find a lean-burn NOx catalyst that has the required activity, durability, and operating temperature range. Lean-burn NOx catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn catalysts are unacceptably low.

SCR generally refers to selective catalytic reduction of NOx by ammonia. The reaction takes place even in an oxidizing environment. The NOx can be temporarily stored in an adsorbant or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

LNTs are NOx adsorbants with catalysts that reduce NOx during regeneration. The adsorbant is typically an alkaline earth oxide adsorbant, such as $BaCO_3$ and the catalyst is typically a precious metal, such as Pt or Ru. In lean exhaust, the catalyst speeds oxidizing reactions that lead to NOx adsorption. Accumulated NOx is removed and the LNT is regenerated by creating a reducing environment within the LNT. In a rich environment, the catalyst activates reactions by which adsorbed NOx is reduced and desorbed.

Regeneration to remove accumulated NOx may be referred to as denitration in order to distinguish desulfation, described below. The reducing environment for denitration can be created in several ways. One approach uses the engine to create a rich fuel-air mixture. For example, the engine can inject extra fuel into the exhaust within one or more cylinders prior to expelling the exhaust. A reducing environment can also be created by injecting a reductant into the exhaust downstream of the engine. In either case, a portion of the reductant is generally expended to consume excess oxygen in the exhaust. To lessen the amount of excess oxygen and reduce the amount of reductant expended consuming excess oxygen, the engine may be throttled, although such throttling may have an adverse effect on the performance of some engines.

Reductant can consume excess oxygen by either combustion or reforming reactions. Typically, the reactions take place upstream of the LNT over an oxidation catalyst or in a reformer. The reductant can also be oxidized directly in the LNT, but this tends to result in faster thermal aging. As an example, U.S. Pat. Pub. No. 2003/0101713 describes an exhaust system with a fuel reformer placed inline with the exhaust and upstream of a LNT. The reformer includes both oxidation and reforming catalysts. The reformer both removes excess oxygen and converts the diesel fuel reductant into more reactive reformate.

In addition to accumulating NOx, LNTs accumulate SOx. SOx is the combustion product of sulfur present in ordinarily diesel fuel. Even with reduced sulfur fuels, the amount of SOx produced by diesel combustion is significant. SOx adsorbs more strongly than NOx and necessitates a more stringent, though less frequent, regeneration. Desulfation requires elevated temperatures as well as a reducing atmosphere. The elevated temperatures required for desulfation can be produced by oxidizing reductant.

It is known that a NOx adsorber-catalyst can produce ammonia during denitration and from this knowledge it has been proposed to combine a NOx adsorber-catalyst and an ammonia SCR catalyst into one system. Ammonia produced by the NOx adsorber-catalyst during regeneration is captured by the SCR catalyst for subsequent use in reducing NOx, thereby improving conversion efficiency over a stand-alone NOx adsorber-catalyst with no increase in fuel penalty or precious metal usage. U.S. Pat. No. 6,732,507 describes such a system. U.S. Pat. Pub. No. 2004/0076565 describes such systems wherein both components are contained within a single shell or disbursed over one substrate. WO 2004/090296 describes such a system wherein there is an inline reformer upstream of the NOx adsorber-catalyst and the SCR catalyst.

It is known that LNTs function optimally only within limited temperature ranges. U.S. Pat. Pub. No. 2003/0074888 states that NOx reduction by a LNT is particularly efficient in the temperature range from 300 to 350° C. The disclosure suggests heat exchange within the exhaust gas treatment system to maintain temperatures within a desired range. U.S. Pat. No. 5,404,719 suggests another method of maintaining the temperature of a LNT within a range where adsorption is efficient. When the temperature needs to be increased, fuel is injected into the exhaust. When the temperature needs to be decreased, air is injected into the exhaust.

U.S. Pat. No. 6,866,610 suggests using a continuously variable transmission (CVT) to prevent a catalytic converter having a NOx storage reduction catalyst from cooling below an activation temperature. In general, the CVT system is controlled to provide torque multipliers at which the engine produces a required power with optimal fuel economy. If, however, the optimal fuel economy operating point would place the exhaust temperature in a low range, a different torque ratio and engine operating point is selected to increase the exhaust temperature.

Some other uses of a CVT in connection with exhaust aftertreatment have been proposed. U.S. Pat. No. 6,135,917 describes using CVT to select operating points to speed the light-off of a catalytic converter. U.S. Pat. No. 6,157,885 describes using a CVT system to avoid high exhaust temperatures that would damage an exhaust gas purification system. U.S. Pat. No. 6,188,944 suggests using CVT to mitigate torque variations when a lean-burn gasoline engine is run rich in order to regenerate a LNT.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations.

SUMMARY

The present disclosure includes several concepts in which a transmission, preferably a continuously variable transmission (CVT), is used to facilitate the operation of an exhaust aftertreatment system. Additional concepts relate to methods of controlling exhaust aftertreatment. These methods are, in general, particularly useful when used in connection with power generation systems having CVTs.

One concept relates to a power generation system having a fuel reformer positioned inline with an engine exhaust stream. A transmission controller is configured to select operating points for the engine in order to facilitate start-up or operation of the fuel reformer. In one embodiment, the controller is configured to select operating points to heat the exhaust and thus the reformer prior to starting the reformer. This approach can reduce the reformer start-up time and allows the reformer to be started in situations where the reformer would otherwise be too cool to start with fuel injection alone.

Another concept relates to a method of starting a fuel reformer configured inline with an exhaust system. The transmission is used to shift the operating point of the engine to produce a hotter exhaust without affecting the engine's power output. The hotter exhaust is allowed to heat the reformer for a period. If necessary, fuel can be injected and combusted in the reformer to provide further heating. The fuel injection rate is then set, optionally in conjunction with reducing the oxygen content of the exhaust, to provide lambda less than 1.0, whereby the reformer begins to produce substantial quantities of reformate.

Another concept relates to a power generation system comprising a LNT for exhaust aftertreatment. A transmission controller is configured to select operating points for the engine to reduce or limit the oxygen concentration in the exhaust during denitration or desulfation of the LNT. The operating point selection generally reduces the fuel penalty associated with consuming excess oxygen in the exhaust during regeneration. This approach is particularly useful when the aftertreatment system has an inline reformer. Reducing the oxygen concentration may also prevent the reformer and/or the LNT from overheating.

Another concept relates to a method of regenerating a LNT in which a reductant is injected into the exhaust to provide a reducing environment for the LNT. A transmission is used to reduce or limit the exhaust oxygen concentration during the regeneration. In one embodiment, the transmission is directed to shift an engine operating point prior to beginning reductant injection in order to allow time for a desired operating point to be reached prior to injecting the reductant.

Another concept also relates to a method of regenerating a LNT. The method involves injecting a reductant into the exhaust to consume excess oxygen and reduce NOx stored in the LNT. A transmission is used to reduce a fuel penalty for the regeneration. The fuel penalty includes at least a contribution associated with consuming excess oxygen in the exhaust. In one embodiment, the fuel penalty also includes a contribution associated with operating an engine at points apart from its optimal fuel economy operating points. This method can take into account complex effects of both exhaust oxygen concentration and exhaust flow rate on a fuel penalty associated with regeneration.

Another concept relates to a power generation system comprising a LNT for exhaust aftertreatment. The LNT has an effective operating temperature range. When the LNT is near a limit of its effective operating temperature range, the transmission is used to select operating points that increase the LNT's effectiveness. Generally, these operating points reduce the exhaust flow rate, although other factors such as the exhaust temperature may also be taken into account in selecting the operating points. Preferably, the LNT's effective operating temperature range includes exhaust temperatures produced by the engine at its point of peak power output, whereby the LNT does not approach the limits of its effective operating temperature range except when the engine is at less than peak power. At lower power levels, it is generally possible to select operating points that provide lower exhaust flow rates than the flow rate occurring at the peak power level. Reducing the exhaust flow rate can be more effective than adjusting the exhaust temperature in maintaining the LNT's effectiveness.

Another concept relates to a method of operating an exhaust aftertreatment system comprising removing NOx from a vehicle's engine exhaust; from time-to-time, regenerating to remove NOx from a NOx adsorber-catalyst of the aftertreatment system; and from time-to-time, regenerating to remove SOx from the NOx adsorber-catalyst. According to this concept, one or more parameters for one or both types of regeneration varies, whereby the saturation of NOx and/or SOx in the NOx adsorber-catalyst is reduced to a lower level when an operating state makes the NOx adsorber-catalyst otherwise less effective or places a greater demand for conversion efficiency on the NOx adsorber-catalyst. Where the operating state reduces the LNT efficiency or creates a high demand for LNT efficiency, more extensive regenerations can be used to compensate. On the other hand, where the operating state allows for lower LNT efficiency, less frequent or less extensive regeneration can be used. Less frequent or less extensive regenerations can reduce the fuel penalty associated with regeneration. Less frequent and/or shorter desulfations may also increase the life of the LNT.

The operating state can relate to whether the LNT is at the limit of its effective operating temperature range, a degree of poisoning, or an engine operating state. The engine operating state generally relates to power demands. Particularly where a CVT is used, the exhaust flow rate is generally relatively low for all but the highest levels of power demand. Lower exhaust flow rates place lower demands on the aftertreatment system. Selectively tolerating high degrees of sulfur poisoning or NOx saturation during periods of low exhaust flow allows the efficiency of denitrations and/or desulfations to be increased over a large portion of a vehicle's operating cycle. In addition, the number and/or duration of desulfations can be significantly reduced.

Another concept relates to a power generation system comprising an exhaust aftertreatment system, a transmission and an engine tuned whereby the engine can be efficiently maintained within a narrow speed range, e.g. within a 300 RPM range, for all levels of power output. The narrow speed range is generally a low speed range, whereby the peak volumetric flow rate of the exhaust is low in comparison to a conventional power generation system and the demands on the aftertreatment system are correspondingly less. In one embodiment, the lower demands on the aftertreatment system are used to reduce catalyst loading in an aftertreatment device. In another embodiment, the lower demands on the aftertreatment system are used to operate a LNT with more efficient, less frequent, and/or shorter regenerations.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description and annexed drawings. The concepts disclosed herein may be generalized, narrowed, and combined in various ways with the ultimate statement of what the inventors claim as their invention being reserved for the claims that follow.

DETAILED DESCRIPTION

Figure 1:
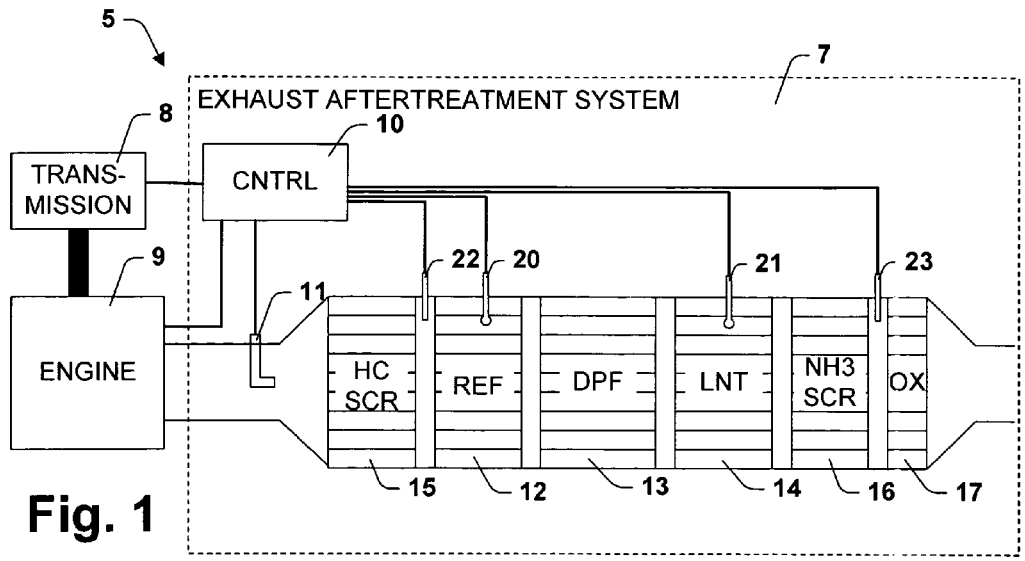
FIG. 1 is a schematic illustration of an exemplary power generation system.

FIG. 1 is a schematic illustration of an exemplary power generation system 5, representing one of many systems in which various concepts of the inventors can be implemented. The system 5 comprises an engine 9, a transmission 8, and an exhaust aftertreatment system 7. The exhaust aftertreatment system 7 includes a controller 10, a fuel injector 11, a lean NOx catalyst 15, a reformer 12, a diesel particulate filter (DPF) 13, a lean NOx-trap (LNT) 14, an ammonia-SCR catalyst 16, and a clean-up catalyst 17. The controller 10 receives data from several sources, include temperature sensors 20 and 21 and NOx sensors 22 and 23. The controller 10 may be an engine control unit (ECU) that also controls the transmission 8 and the exhaust aftertreatment system 7 or may include several control units that collectively perform these functions.

The transmission 8 is generally of a type that allows selection from among a large number of widely ranging torque multipliers and makes available a range of operating points at which the engine 9 can meet a given power demand. Typically, the transmission 8 is a continuously variable transmission (CVT).

The lean-NOx catalyst 15 removes a portion of the NOx from the engine exhaust using reductants, typically hydrocarbons that form part of the exhaust or have been stored by the lean-NOx catalyst 15. The DPF 13 removes particulates from the exhaust. During lean operation (a lean phase), the LNT 14 adsorbs a second portion of the NOx. The ammonia-SCR catalyst 16 may have ammonia stored from a previous regeneration of the LNT 14 (a rich phase). If the ammonia-SCR catalyst 16 contains stored ammonia, it removes a third portion of the NOx from the lean exhaust. The clean-up catalyst 17 may serve to oxidize CO and unburned hydrocarbons remaining in the exhaust.

From time-to-time, the LNT 14 must be regenerated to remove accumulated NOx (denitrated). Denitration may involve heating the reformer 12 to an operational temperature and then injecting fuel using the fuel injector 11. The reformer 12 uses the injected fuel to consume excess oxygen in the exhaust while producing reformate. The reformate thus produced reduces NOx adsorbed in the LNT 14. Some of this NOx is reduced to $NH_3$, most of which is captured by the ammonia-SCR catalyst 16 and used to reduce NOx during a subsequent lean phase. The clean-up catalyst 17 oxidizes unused reductants and unadsorbed $NH_3$ using stored oxygen. During regeneration, the lean-NOx catalyst 15 may store reductant for later use. The DPF 13 may serve to protect the LNT 14 from excessive temperatures by providing a buffer between the reformer 12 and the LNT 14. Reducing the number and/or magnitude of temperature excursions in the LNT 14 may extend the life of the LNT 14.

From time-to-time, the LNT 14 must also be regenerated to remove accumulated SOx (desulfated). Desulfation may involve heating the reformer 12 to an operational temperature, heating the LNT 14 to a desulfating temperature, and providing the heated LNT 14 with a reducing atmosphere. A typical desulfation temperature is in the range from about 500 to about 800° C., more typically in the range from about 650 to about 750° C. Below a minimum temperature, desulfation is very slow. Above a maximum temperature, the LNT 14 may be damaged. A desulfation temperature is generally obtained by combustion of injected fuel in the reformer 12. The reformer 12 can generally be operated continuously unless it is necessary to pulse the fuel supply rate to prevent either the reformer 12, the DPF 13, the LNT 14, or the ammonia-SCR catalyst 16 from overheating. Pulsing allows devices to cool between fuel pulses.

Figure 2:
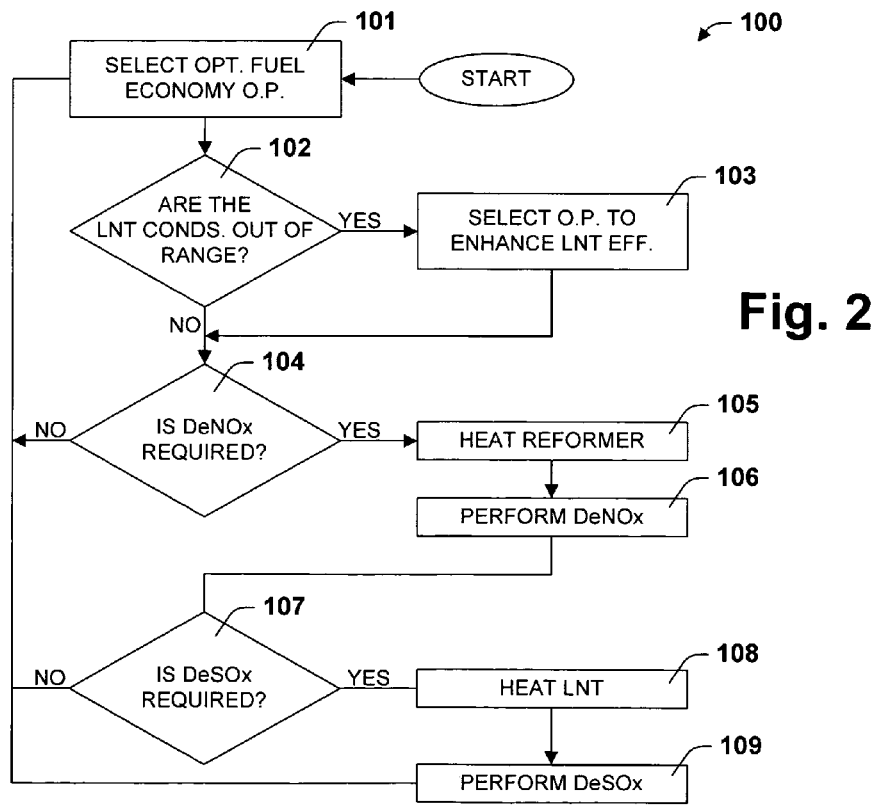
FIG. 2 is a flow chart of an exemplary method of operating a power generation system.

FIG. 2 is a flow chart of a process 100 embodying several of the inventors' concepts for operating the aftertreatment system 7 in conjunction with the engine 9 and the transmission 8. The controller 10 can be configured to implement the process 100. The process 100 begins in step 101, wherein a default choice is made for the engine operating point. In the present disclosure, an operating point selection and in particular an engine operating point selection made through a transmission, should be understood as a selection of a torque multiplier. The selection of a torque multiplier determines one from a plurality of engine speed-torque combinations that can produce a given power level, the power level generally being determined by vehicle operation. Accordingly, operating points can be characterized in terms of engine speed and power level or engine speed and torque multiplier. Typically, the default operating point selection implemented by step 101 provide optimal fuel economy operating points. The default operating points can be influenced by other factors, such as mitigating NOx emissions. Fuel economy can be defined in any suitable fashion. In one embodiment, the fuel economy is measured strictly in terms of the engine's fuel consumption. In another embodiment, the fuel economy includes a fuel penalty for exhaust aftertreatment, which is a function of the engine's NOx production rate.

Figure 3:
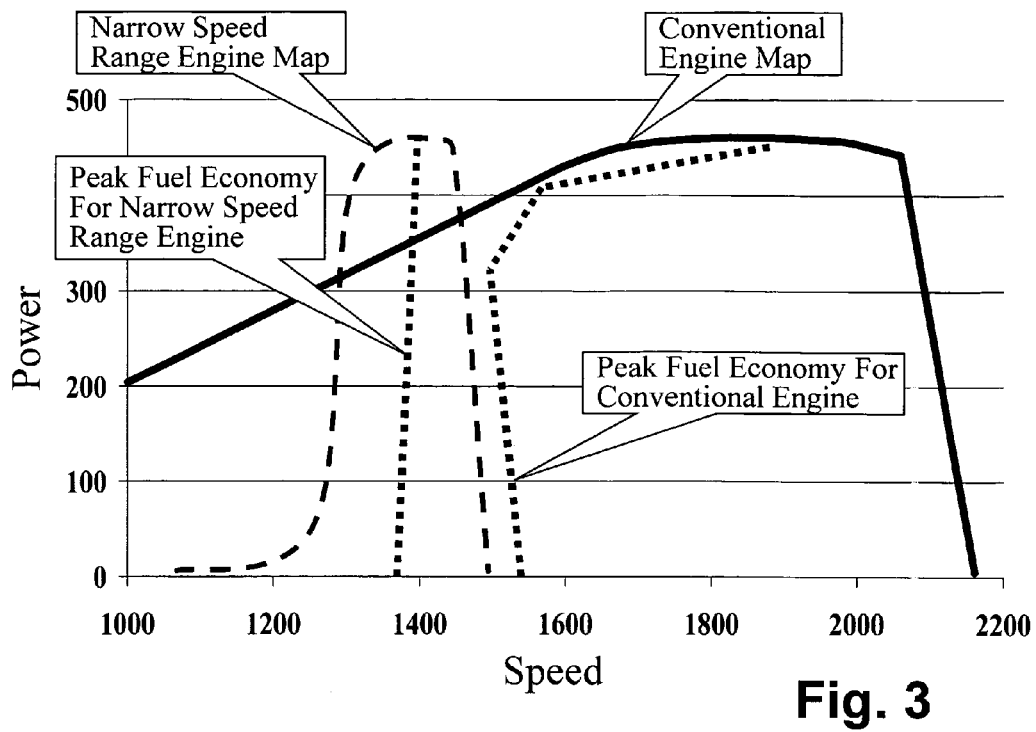
FIG. 3 is a plot showing optimal fuel economy operating points for conventional and narrow-speed range diesel engines.

FIG. 3 includes a rough plot of optimal fuel economy operating points as a function of power level for a typical diesel engine having a CVT. The engine speed for optimal fuel economy is relatively low for most power demands, as are exhaust flow rates. At peak power demands, which typically occur only over a small fraction of a vehicle's operating cycle, engine speeds are much higher. Exhaust flow rates generally vary in a similar manner to the engine speed, although their variation is generally wider due to concomitant variations in factors such as, EGR, turbocharging, and exhaust temperature. An aftertreatment system must be deigned to handle the extremes of exhaust temperature and flow rate that occur over the course of vehicle operation.

Figure 4:
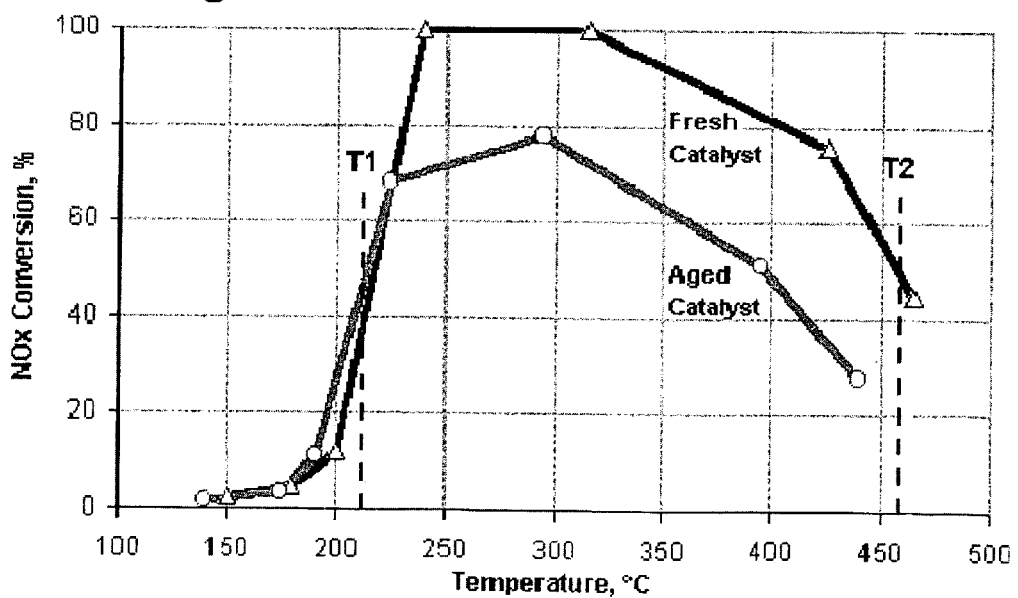
FIG. 4 is an exemplary plot of LNT effectiveness as a function of temperature with examples of fresh and aged (poisoned) catalysts.

Exhaust aftertreatment devices have efficiencies that depend on temperature. FIG. 4 is an exemplary plot of NOx removal efficiency for a LNT as a function of temperature. If 50% conversion is considered the limit of effectiveness, the effective temperature range is from about 220° C. to about 460° C. for a fresh catalyst and from about 220° C. to about 390° C. for an aged catalyst. Near the range limits, the LNT effectiveness varies rapidly with temperature. Effectiveness can be defined in any suitable fashion. Different LNT compositions give different effective temperature ranges. A LNT can be designed to operate efficiently at the temperatures occurring during peak power demand, but such a design may not perform as well at temperatures that occur at lower power demands.

Exhaust aftertreatment device efficiencies also depend on volumetric flow rate of the exhaust. Flow rate also has a significant effect on LNT performance. The conversion of a LNT will generally depend on flow rate according to a formula similar to:

$$f_{NOx} = 1 - e^{\frac{-kV}{F}} \quad (1)$$

where $f_{NOx}$ is the fractional conversion of NOx, k is a reaction rate constant, V is the LNT volume, and F is the volumetric flow rate through the LNT. When F is decreased, the effect can be substantial. For example, if conversion is at 50%, Equation (1) indicates that halving the flow rate will increase the conversion to 75%.

Another of the inventors' concepts is to select operating points to enhance the efficiency of an aftertreatment system over at least part of a vehicle's operating cycle, for example at points in the cycle where the aftertreatment system is near a limit of its effective operating range and would not have a satisfactory effectiveness at an optimal fuel economy operating point. In this regard, the method generally involves selecting operating points that depart from an optimal brake-specific fuel economy operating point choice. A distinguishing feature of this concept is that it takes into consideration the effect of exhaust volumetric flow rate on the aftertreatment system efficiency. Thus, in departing from an optimal fuel economy operating point, the exhaust temperature can actually move in a direction of decreasing exhaust aftertreatment efficiency, provided the effect is more than offset by a decrease in the exhaust flow rate. This concept can be used to reduce the design requirements for an aftertreatment system or the frequency or extent to which an aftertreatment system is regenerated.

In an exemplary implementation of this concept, step 102 performs a check to determine whether the LNT 14 is in a satisfactory operating range. A satisfactory operating range can be defined in any suitable fashion. In one embodiment, it is defined by upper and lower temperature limits. In another embodiment, it is defined by an area on a temperature-exhaust flow rate map. In a further embodiment, it is defined in terms of the LNT 14's ability to effectively reduce NOx, as determined in any appropriate manner. The temperature of the LNT 14 can be measured directly through temperature sensor 21. Optionally, the temperature is determined from the exhaust temperature on the basis that the temperature of LNT 14 rises and falls with exhaust temperature. Exhaust temperature can be measured directly, or determined based on the engine 9's operating point. If the LNT 14 is not in a satisfactory operating range, the process proceeds to step 103.

Step 103 implements the concept of selecting operating points to improve the performance of the LNT 14. The transmission 8 provides access to a range of operating points for producing a given power output. Among these operating points, exhaust temperatures and flow rates may vary significantly. By selecting an appropriate operating point, the performance of the LNT 14 can often be improved without undue consequences in terms of fuel economy, emissions, or engine performance.

Step 103 involves making a search among operating points that provide the currently required power level in order to find one that improves LNT performance. In evaluating each operating point, at least the effect of exhaust flow rate on performance of the LNT 14 is considered. Generally the effects of both the exhaust flow rate and the exhaust temperature are considered. Where the engine 9 has a turbocharger, the temperature considered in making this evaluation is preferably an exhaust temperature downstream of a turbine, as opposed to upstream of the turbine. There is a significant temperature drop in the exhaust as it passes the turbine, and the degree of this drop depends on the turbine vane position, the setting of which can vary from operating point-to-operating point.

In addition to effects on LNT performance, various other constraints and biases may be included in the operating point selection of step 103. An operating point selection may be biased based on a fuel penalty measure or emissions rates. For example, the operating point may be selected to minimize brake-specific fuel consumption (BSFC) subject to a limit on brake-specific NOx emission from the aftertreatment system 7. This would not provide an optimal fuel economy operating point in the usual sense, but rather would provide a minimal departure from an optimal fuel economy operating point while enhancing the efficiency of the LNT 14 and the aftertreatment system 7. A brake-specific NOx emission could consider both NOx production by the engine 9, which varies with operating point, and the effects on efficiency of the LNT 14 and optionally on the efficiencies of other components of the aftertreatment system 7. If one or more engine operating parameters can be varied independently of power level-engine speed selection, a search for an optimal operating point can include a search and selection among possible values for these other engine operating parameters.

In some cases, the operating point selections can be made in advance. When operating point selections are made in advance, they are typically referred to as operating point maps. An operating point map gives the torque multiplication factor or an equivalent setting, as a function of power level. The method 100 would use one operating point map for step 101 and another operating point map for step 103. Operating point selections will generally be made in advance if they do not depend on variable conditions or feedback control. Examples of conditions include ambient air temperature and engine temperature. Feedback control could be provided based on actual response of the LNT 14 to changes in operating point.

An operating point selection typically depends on several variables not all of which vary linearly or monotonically with engine speed. Any suitable approach can be used to address this complexity. One approach uses table look-ups, wherein for a particular situation such as reformer start-up, denitration, or desulfation, preferred operating points at various power levels are determined in advance by simulation and/or experiment. Another approach relies on storing and retrieving only some data, such as exhaust temperatures and compositions at various operating points. This data can then be applied together with sensor data, ambient air temperature for example, in a model. The model is evaluated at several operating points to determine which best achieves the desired result.

Whether operating points are selected in step 101 or step 103, the process 100 proceeds to step 104 wherein a check is made whether to regenerate the LNT 14 to remove accumulated NOx. In general, any suitable method can be used to control the timing of regeneration in terms of selecting an endpoint for a lean phase and/or an endpoint for a rich phase. Generally, a control method will be designed to regenerate the LNT 14 in order to meet an emission control criteria. The emission control criteria could include one or more of a limit on NOx concentration in the treated exhaust and a limited on brake-specific NOx emission rates.

One control method is based on feedback from the NOx sensor 23. In one example, when the exhaust NOx concentration exceeds a critical value, regeneration begins and proceeds to a fixed endpoint. In another example, regeneration begins when a brake-specific NOx emission rate exceeds a critical value. A brake-specific NOx emission rate can be based on data from the NOx sensor 23 normalized with data from the engine 9.

If the endpoint of the lean phase is determined based on a NOx emission rate or concentration, the degree of NOx saturation at the beginning of regeneration will vary with operating state even though no parameter of regeneration depends on operating state. For example, if the power level and the exhaust flow rate increase, the NOx emission rate and concentration will be higher for a given NOx saturation. If the sulfur poisoning level is higher, this will also increase the NOx emission at fixed NOx saturation, causing regeneration based on NOx concentration to begin earlier.

The endpoint of regeneration can be based on an estimate of NOx saturation in the LNT 14. Typically, this estimate is based on reductant slip. Alternatively, regeneration can be calculated to remove a fixed amount of NOx, whereby if the level of saturation at the beginning of regeneration varies with operating state, the level of saturation at the end of regeneration will also vary. A fixed amount of NOx removal can be estimated, for example, based on the length of the rich phase or the amount of reductant supplied during the rich phase.

A possible difficulty with the foregoing methods is that the LNT 14 may release a significant quantity of unreduced NOx at the beginning of each rich phase. This release may cause a temporary increase in the NOx emission rate, whereby a limitation on instantaneous NOx emissions may be exceeded. Specifically, in the simple control described above, regeneration may begin when the outlet NOx concentration reaches a pre-specified value. At the beginning of regeneration, there may be a NOx spike that tends to cause the NOx concentration to rise even higher, exceeding the pre-specified value and possibly exceeding a regulatory limit on instantaneous NOx emissions. Avoiding the limit may lead to over-designing the aftertreatment system 7 and initiating regenerations in many cases well before they are actually required, which can increase the overall fuel penalty for aftertreatment.

Figure 5:
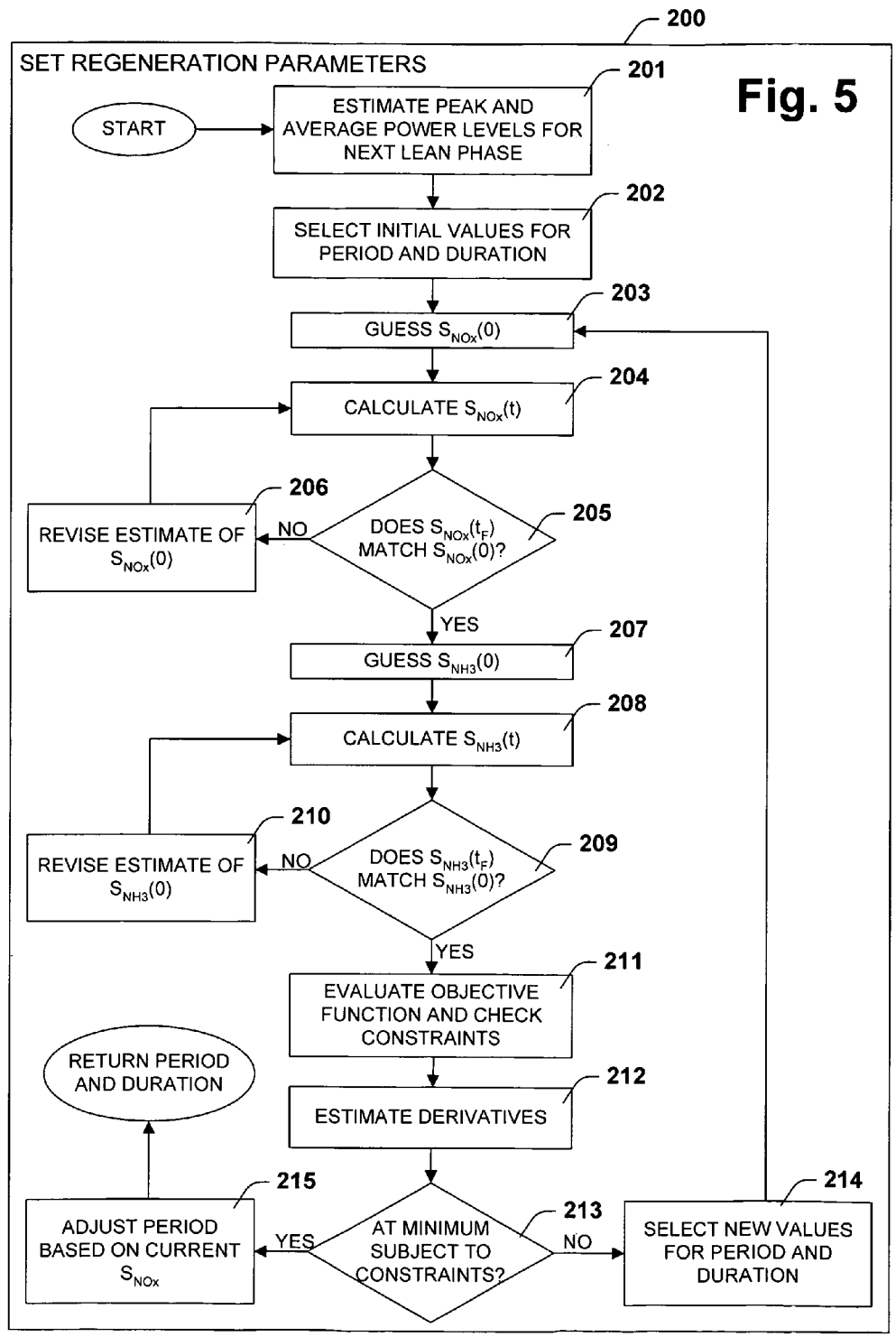
FIG. 5 is a flow chart of an exemplary method for selecting regeneration parameters.

FIG. 5 illustrates an exemplary method 200 that addresses this issue and provides a more systematic basis for selecting points at which to begin and end a regeneration. The method 200 implements several of the inventors' concepts, including that of making the beginning and ending points of denitration dependent on an operating state. The beginning and ending points vary such that the extent of denitration is less and a higher nitrogen loading level is tolerated in vehicle operating states that require less NOx-reducing activity from the LNT 14. By tolerating higher nitrogen loading levels when less NOx-reducing activity is required of the LNT 14, the use of reductants is expected to be more efficient and the fuel penalty for regeneration is expected to be less.

The operating state can be defined in any suitable fashion. In one embodiment, the operating state is an engine operating state and relates to engine power requirements or is a direct measure of power demand. The engine operating state may relate to an instantaneous state, e.g., current power demand, or a more enduring state, e.g., city driving, highway driving, uphill driving, downhill driving, accelerating, decelerating, etc. Typically, if the engine 9 is kept near its peak fuel economy operating points, its speed, and consequently the volumetric flow rate of the exhaust, will be relatively low for all but the highest levels of power demand. As indicated by Equation (1), LNT conversion efficiency is generally high when the exhaust flow rate is low. The LNT 14 will be designed to meet the demands of the peak flow rate operating conditions that typically occur only during a small fraction of the vehicle's operating cycle. With respect to other engine operating states, where the exhaust flow rate is generally lower, the LNT 14 will generally be over-designed.

One concept is to use this over-design to operate the LNT at high NOx saturations. Operating at high NOx saturations may involve allowing the NOx saturation to become high before beginning regeneration. Operating at high NOx saturation may also involve terminating a denitration while the level of NOx saturation in the LNT 14 remains comparatively high.

Figure 6:
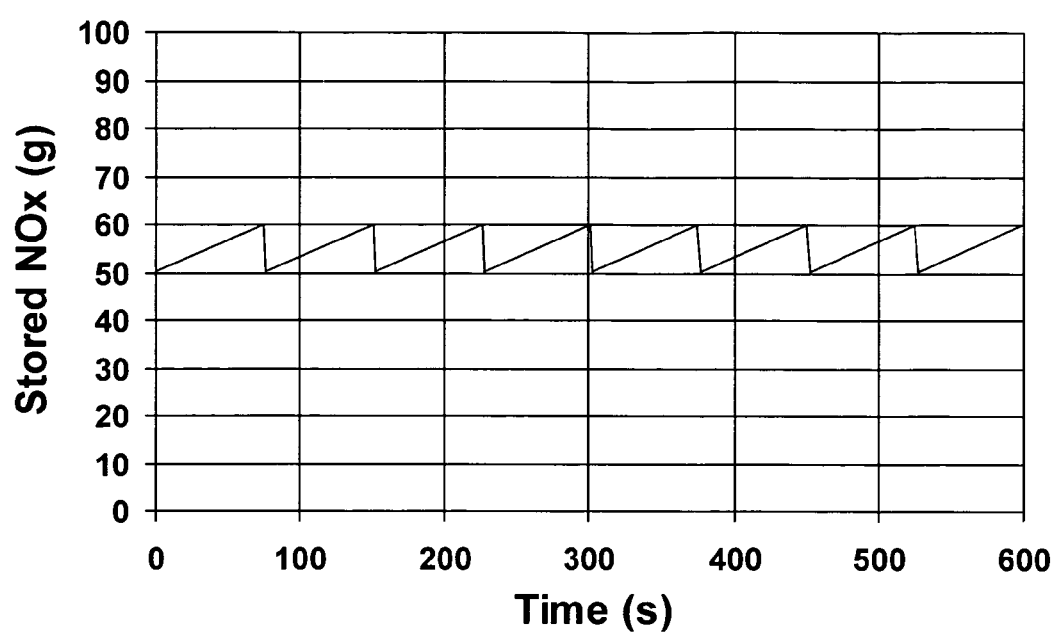
FIG. 6 is an exemplary plot of NOx saturation for an LNT through a series of lean/rich cycles.

FIG. 6 is a theoretical plot of NOx saturation in a LNT through a series of regeneration cycles. The plot assumes that exhaust conditions remain constant except for switching between lean and rich phases. Over a series of lean and rich phases, the NOx saturation in the LNT falls into a cyclic pattern. The pattern has a maximum that occurs near the end of each lean phase and a minimum that occurs at the end of each rich phase. The magnitude of these minimum and maximum depend on the frequency and duration of the regeneration cycle. A regeneration method as conceived by the inventors will set the duration of a regeneration cycle and/or the period between regenerations to increase the minimum, maximum, and/or average saturation in a manner that depends on operating states, whereby greater fuel economy can be achieved when lesser demands are placed on the exhaust aftertreatment system performance.

The exemplary method 200 uses a model with a constant exhaust condition, whereby NOx saturations are projected to fall into a pattern such as illustrated by FIG. 6. The model is used to predict LNT saturations and NOx emissions over future cycles as a function of regeneration parameters. These projections are used to calculate optimal values for the regeneration parameters. The model captures the effects of such factors as operating state, LNT temperature, and LNT poisoning level. Other approaches could be taken to capture these dependencies and achieve similar results. The optimal parameter values calculated using the constant exhaust condition assumption are later converted to a form in which they are relatively insensitive to varying exhaust conditions.

The method 200 begins with step 201 in which an estimate is made of peak and average power levels for the next lean phase. The peak power estimate is used to set a minimum to which the efficiency of the aftertreatment system will be allowed to drop at any point during the lean/rich cycle. The average power level is used in projecting exhaust flow rates, temperatures, and NOx concentrations and to calculate fuel penalty and perform other calculations relating to the determination of a "best" period (interval between regenerations) and duration (length of regenerations) subject to constraints, such as the constraint that the efficiency of the aftertreatment system never drop below the minimum determined with reference to the peak power estimate.

The peak power level can be chosen in any suitable fashion. Examples of suitable approaches include making the peak equal to the current power level, making the peak equal to the highest level realized in a preceding period, such as three minutes, or one of the forgoing numbers multiplied by a margin of safety, e.g., 1.15. Another example is to select the peak according to a characterization of the driving state, e.g., one peak power being used for hill climbing or sustained acceleration and another, lower peak power being used for other conditions. The average power level can be assumed to be the same as the peak power level or can be selected in a similar fashion. For example, the average power level can be assumed to be the average power level during a preceding period or can be set equal to the current power level.

The next several steps constitute a process of searching among possible values for period and duration for values that optimize an objective function subject to the constraints. An objective function can be a fuel penalty measure. A fuel penalty measure generally includes a start-up penalty for heating the reformer 12 and consuming oxygen stored in the LNT 14, an oxygen consumption fuel penalty for consuming excess oxygen in the exhaust during regeneration, a fuel penalty for producing reductant consumed in reducing NOx adsorbed in the LNT 14, and a reductant slip fuel penalty for producing reductant that passes through the LNT 14 unconsumed.

The search begins in step 202 where initial guesses for the optimal period and duration are made. Generally, a period and duration determined from a previous application of the process 200 provides an appropriate guess.

Step 203 is guessing $S_{NOx}(0)$, the NOx saturation of the LNT at the beginning of a lean phase in a cycle such as illustrated in FIG. 6. This is the beginning of an iterative calculation for $S_{NOx}(0)$, which ultimately depends on the currently selected period and duration and the assumed average power level.

Step 204 performs an integration to calculate $S_{NOx}(t)$ through a projected lean phase, and then a projected rich phase. The calculation is performed using the assumed power level, and consequent values of exhaust flow rate, temperature, and NOx concentration, and any other factors taken into account in projecting the rate of NOx uptake by the LNT 14. The LNT temperature can be assumed to be the same as the exhaust temperature.

In a preferred embodiment, the NOx uptake model has a dependency on a measure of reversible sulfur poisoning of the LNT 14. Capturing this dependency is useful in control strategies related to desulfation and also facilitates using more frequent and/or extensive denitrations to compensate for sulfur poisoning. An exemplary model also includes a factor related to irreversible poisoning. The exemplary model gives the NOx uptake rate, $dS_{NOx}/dt$ during the lean phase, as:

$$\frac{dS_{NOx}}{dt} = \left(1 - e^{\frac{-k(T, S_{Pois})(1-(S_{SOx}+S_{NOx}))V}{F}}\right)\frac{FC_{NOx}}{Y_{Nox}} \qquad (2)$$

where the first term in parenthesis corresponds to Equation (1), $C_{NOx}$ is the concentration of NOx in the exhaust, and $Y_{NOx}$ is the molar NOx storage capacity of the LNT 14. $S_{SOx}$ is the fraction of active sites that are sulfur poisoned and $S_{Pois}$ is the fraction of catalyst that is irreversibly poisoned. The adsorption rate is proportional to the number of unoccupied active sites. The rate coefficient k of Equation (1) has been shown as a function of the temperature, T, and irreversible poisoning. An exemplary function k is plotted in FIG. 4, wherein the degree of aging corresponds to the degree of poisoning. The detailed functionality can be determined experimentally with systematic poisoning and measurements at various temperatures. The initial values of $S_{SOx}$ and $S_{Pois}$ can be zero or the values obtained at the end of the last vehicle operating cycle. The values are updated in other steps of the method 100 as described more fully below. Irreversible catalyst deactivation and permanent loss of adsorption capacity can be modeled separately, if desired. The details of the model used are not critical.

In a preferred embodiment, a model for the NOx removal rate during the rich phase depends on the NOx saturation. Such a model can be used to capture the effect of NOx saturation on fuel penalty and is useful in a strategy of operating at high NOx saturation, when practical, to reduce fuel penalty. In the exemplary model the NOx removal rate from the LNT 14 during the rich phase is given by:

$$\frac{dS_{NOx}}{dt} = -\left(1 - e^{\frac{-k_{red}(T, S_{Pois})S_{NOx}V}{F}}\right)\frac{FC_{red}}{\alpha Y_{Nox}} \qquad (3)$$

where $k_{red}$, which is a function of temperature and catalyst poisoning, $C_{red}$ is the reductant concentration, and $\alpha$ is a coefficient for the stoichiometry of the reduction reaction. In equation (3), the effective rate of reduction is proportional to the NOx saturation, $S_{NOx}$. Step 204 involves integrating Equations (2) and (3) through a lean and a rich phase.

In step 205, $S_{NOx}(t_F)$, the saturation at the end of the rich phase, is compared to $S_{NOx}(0)$, the saturation at the beginning of the lean phase. At a steady state operating condition such as illustrated by FIG. 6, the numbers will be equal. If these numbers are significantly different, the model has not converged and a new estimate for $S_{NOx}(0)$ is made in step 206 and the calculation of step 204 is repeated. If the numbers are approximately the same, the model has converged and the next series of steps begun, in which the performance of the ammonia-SCR catalyst 16 is predicted using a similar iterative procedure.

Step 207 is guessing $S_{NH3}(0)$, the $NH_3$ saturation of the ammonia-SCR 16 at the beginning of a lean phase. Step 208 performs an integration to calculate $S_{NH3}(t)$ through a projected lean phase, and then a projected rich phase. The NOx and ammonia concentrations entering the ammonia-SCR catalyst 16 during the lean phase can be calculated from the model of the LNT 14 used in step 204. The NOx concentration entering the ammonia-SCR reactor 16, $C'_{NOx}$, is given during the lean phase is given by:

$$C'_{NOx} = C_{NOx} e^{\frac{-k(T, S_{Pois})(1-(S_{SOx}+S_{NOx}))V}{F}} \quad (4)$$

The $NH_3$ concentration entering the ammonia-SCR reactor 16, $C'_{NH3}$, is given during the rich phase by given by:

$$C'_{NH3} = \frac{C_{red} x_{NH3}}{\alpha}\left(1 - e^{\frac{-k_{red}(T, S_{Pois}) S_{NOx} V}{F}}\right) \quad (5)$$

wherein $X_{NH3}$ is the fraction of NOx removed from the LNT 14 that is reduced to $NH_3$. As a first approximation, this fraction may be assumed constant. $X_{NH3}$ may actually depend on such factors as temperature, NOx saturation in the LNT 14, and degree of poisoning and a more sophisticated model may take into account one or more of these dependencies.

An exemplary model for ammonia consumption by reactions with NOx in the ammonia-SCR catalyst 15 is:

$$\frac{dS_{NH3}}{dt} = -\left(1 - e^{\frac{-k_{SCR}(T) S_{NH3} V_{SCR}}{F}}\right) \frac{FC'_{NOx}}{\alpha_{SCR} Y_{NH3}} \quad (6)$$

where $k_{SCR}$ is a kinetic constant for reaction in the ammonia-SCR catalyst 16, $V_{SCR}$ is the volume of the SCR catalyst, $\alpha_{SCR}$ is a stoichiometric constant, and $Y_{NH3}$ is the ammonia storage capacity of the ammonia-SCR catalyst 16. An exemplary model for ammonia storage by the ammonia-SCR catalyst 15 is:

$$\frac{dS_{NH3}}{dt} = \left(1 - e^{\frac{-k_{NH3}(T)(1-S_{NH3}) V_{SCR}}{F}}\right) \frac{FC'_{NH3}}{Y_{NH3}} \quad (7)$$

where $k_{NH3}$ is a kinetic constant for ammonia adsorption. Equations (6) and (7) are integrated in step 208. Step 209 is checking for convergence. Step 210 revises $S_{NH3}(0)$ if convergence has not yet been achieved.

After convergence, step 211 evaluates the objective function being optimized. Typically, the objective function will primarily indicate fuel penalty, although weight can be given to other factors. Constraints are also evaluated in step 211. In this example, one of the constraints relates to limiting NOx emission at peak power. To test whether this requirement is met, an instantaneous NOx emission is computed assuming a peak power condition occurs at the end of a lean phase.

The exemplary models used to calculate $S_{NOx}$ and $S_{NH3}$ and to evaluate the objective function did not include a NOx spike at the beginning of regeneration. The exemplary model can be modified to account for the NOx spike, if desired. Whether or not a NOx spike model is used to calculate $S_{NOx}$ and $S_{NH3}$ and to evaluate the objective function, it is preferred that a model for a NOx spike be used in calculating whether a peak instantaneous NOx emission constraint is violated. Moreover, whereas $S_{NOx}$, $S_{NH3}$, and the objective function are preferably computed using best estimates, including a best estimate for the size of the NOx spike if one is used, the NOx emission constraint is preferably calculated using a worst case scenario, i.e., a NOx spike of the largest total volume and occurring in the quickest burst as experiments indicate could realistically occur. Thus, a peak NOx emission constraint is preferably checked assuming a peak power condition occurs while $S_{NOx}$ and $S_{NH3}$ are at the values predicted to occur at the end of the lean phase and also assuming that a regeneration with a comparatively large NOx spike begins shortly thereafter.

Any suitable numerical algorithm can be used to find the period and duration that optimize the object function subject to the constraints. Numerous such algorithms are widely documented and readily ascertainable. Computer software that implements these algorithms is commercially available. Examples of numerical algorithms in this genre include steepest descent, Newton's method, and quasi-Newton methods. Most suitable algorithms involve numerically estimating derivatives. Accordingly, step 212 is provided to calculate these derivatives. Numerically calculating a derivative involves making a small perturbation in the variable and observing its effect on a result.

Step 213 is testing for convergence of the numerical method. If convergence has not been achieved, new selections for period and duration are made in step 214 and the calculations are repeated. Once convergence has been reached, the process advances to step 215 where certain transformation are made to the calculated period and duration.

One transformation is to express the period and duration on bases other than time, whereby the control method can adapt to short term variations in operating conditions. For example, the endpoint of a lean phase is preferably express in terms of an amount of NOx supplied to the LNT 14, rather than a fixed period of time. Using the conditions from step 204, the period selected at the end of step 213 can be transformed into a target total engine out NOx between regenerations. The transformation involves multiplying the time-based period by F and $C_{NOx}$. The target can be compared to actual NOx supplied to the LNT 14 as estimated from the engine 9's operating points or calculated using data from a NOx sensor, such as the NOx sensor 22. An ideal amount of NOx to the LNT 14 between regenerations is expected to be much less variable than an ideal amount of time between regenerations.

Instead or time duration for regeneration, total reductant supplied to the LNT 14 is preferably used to determine the endpoint of regeneration. The amount to target is determined from the time-based duration multiplied by F and $C_{red}$. The target amount can be compared to total reductant production as determined from data used to manage the reformer 12 and the fuel injector 11. An ideal amount of reductant to supply to the LNT 14 over the course of a regeneration is expected to be much less variable than an ideal time for a regeneration.

In using the parameters period and duration, it should also be taken into account that the starting values of $S_{NOx}$ and $S_{NH3}$ are not the same as $S_{NOx}(0)$ and $S_{NH3}(0)$ determined by the model. Preferably, estimates of actual $S_{NOx}$ and $S_{NH3}$ are continuously maintained. These estimated can be used to correct the endpoint for the lean phase. For example, if the endpoint for the lean phase is expressed in terms of amount of NOx to the LNT 14 between regenerations, the endpoint can be corrected for an amount of NOx that would take the LNT 14 from the estimate of actual $S_{NOx}$ to $S_{NOx}(0)$ or vice versa. Alternatively, the endpoint of the lean phase can be taken as reached when the estimated value of $S_{NOx}$ reaches the value calculated for the end of the lean phase. The endpoint of regeneration can be taken as the point where the estimated value of actual $S_{NOx}$ reaches the value calculated for the end of the rich phase. Estimates for actual $S_{NOx}$ can be maintained by integrating Equations 2 and 3 through lean and rich phases using actual exhaust conditions.

It should be appreciated that the models and numerical methods described in connection with the process 200 are exemplary and that many other models and methods can be devised that operate in accordance with the various concepts disclosed herein.

Figure 7:
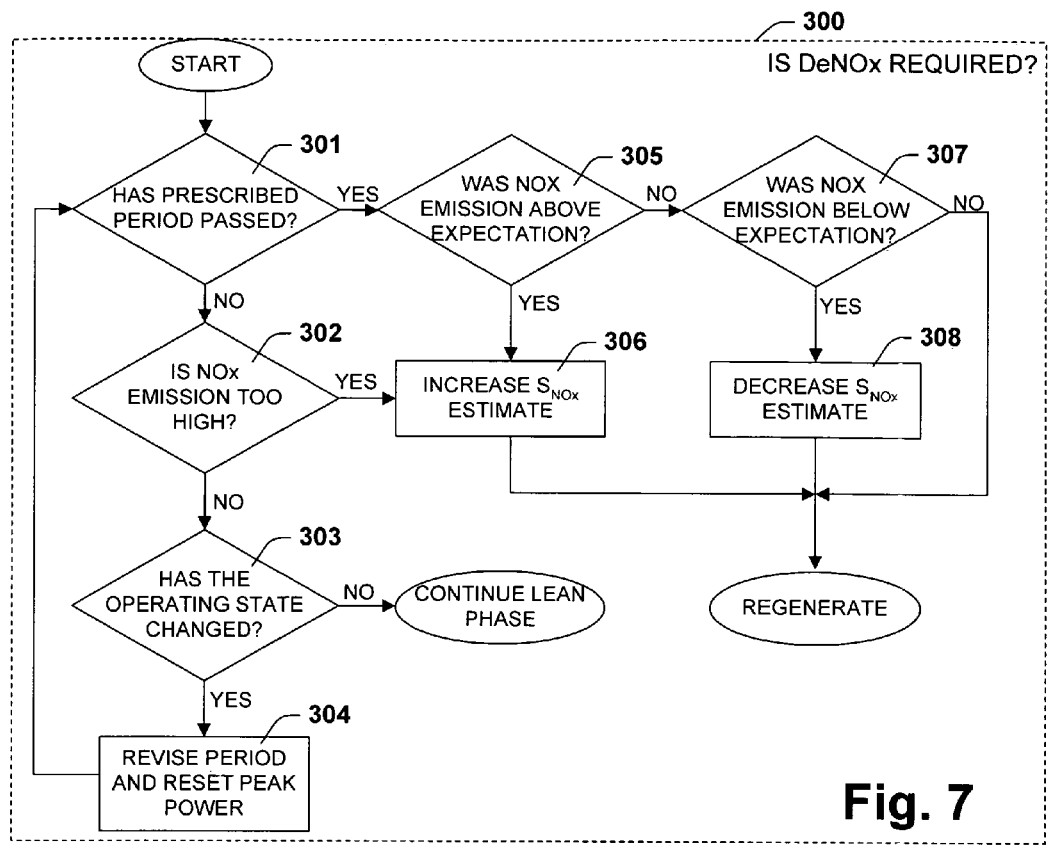
FIG. 7 is a flow chart of an exemplary method for determining whether to initiate a denitration.

The regeneration parameters may be determined at any suitable point in the process 100. In one example, they are initially determined prior to step 101 and subsequently determined in step 104. Regardless of where the parameters are determined, the parameter relating to determining an endpoint for a lean phase is applied in step 104. Step 104 is determining whether denitration is required. FIG. 7 provides an exemplary process 300 that can be applied at step 104.

The process 300 implements several concepts. One concept is to begin regeneration based on either of two criteria being satisfied. One criterion relates to a predetermined endpoint and may be characterized in any appropriate terms, including for example a fixed time interval, an amount of NOx produced by the engine 9 or supplied to the LNT 14, or a target saturation of the LNT 14. The other criterion relates to feedback control and involves checking whether NOx emissions have exceeded a pre-specified level.

Another concept implemented by the process 300 is to revise an estimate of NOx saturation in the LNT 14 based on a NOx emission level measured at the end of a lean phase. In one embodiment, the estimate of NOx saturation is increased or decreased in order to reconcile a difference between a predicted NOx concentration downstream of the LNT 14 at the end of a lean phase and an estimated value for that concentration.

Another concept is to adjust the endpoint for a lean or rich phase in response to a change in operating state. In one example, the change in operating state corresponds to an unanticipated increase in power demand. If the operating state changes, new lean and rich phase endpoints can be calculated, for example by the process 200 using new values for peak and average power. In one embodiment, a regeneration is initiated in response to an increase of power demand.

The process 300 begins with step 301, which is determining whether a predetermined endpoint for the lean phase has been reached. This can involve a measure of time, a determination of the amount of NOx that has been supplied to the LNT 14, or the NOx saturation in the LNT 14, as previously explained in connection with the process 200.

If the predetermined endpoint has not been reached, another check is made in step 302. Step 302 is determining whether a NOx concentration in the treated exhaust is too high. In this example, the NOx concentration is the NOx concentration measured by the sensor 23. The NOx concentration in the treated exhaust may be considered too high, for example, if it meets or exceeds a value predicted for the end of the lean phase or a somewhat higher value. If the NOx concentration is not too high, a third check is performed in step 303. This check is whether a vehicle operating state has changed. For example, step 303 may check whether a peak power has been exceeded. The peak power can be the same peak power used in the process 200, or a different peak power. In any event, if the vehicle operating state has changed, the endpoints for the lean and rich phases are recalculated in step 304 and the various checks repeated using the new values.

If step 301 determines the predetermined endpoint has been reached, a check is made in step 305 whether the NOx emission measured downstream of the LNT 14 was above expectation. The sensor 23 can be used for this purpose, although a sensor immediately downstream of the LNT 14 might provide more accurate data for revising the estimate of NOx saturation. If the sensor reading is above the predicted value, the process assumes that the $S_{NOx}$ is higher than expected. The predicted value is a value predicted by the model of the process 200 using the saturations predicted for the end of the lean phase and current exhaust conditions, such as current temperature, flow rate, and engine-out NOx concentration.

Step 306 increases the current estimate of $S_{NOx}$ in a manner consistent with the NOx concentration reading. Step 306 can also be reached through step 302 if the NOx emission level exceeds a maximum before the predetermined end of the lean phase. One example of a procedure for increasing $S_{NOx}$ is to use the model of process 200 to calculate a value of $S_{NOx}$ that would give the measured NOx concentration. The current estimate for $S_{NOx}$ can be revised to equal that value.

Step 307 checks whether the measured NOx concentration is below expectation. If it is, the estimate for $S_{NOx}$ can be decreased in step 308 much as it is increased in step 306. Whether or not $S_{NOx}$ is increased, decreased, or left unchanged, a regeneration is initiated if the criteria of step 301 or step 302 is met.

Before denitration actually begins, the fuel reformer 12 is started in step 105. Starting the reformer 12 generally involves heating the reformer 12. The reformer 12 can be heated in any suitable fashion. If the reformer is warm enough, it can be heated by injecting diesel fuel. In some operating conditions, however, the exhaust may make the reformer 12 too cold and in any event the reformer can be heated more quickly if it is warmer.

Another of the inventors' concepts is a process for starting a reformer that begins by using a transmission to select operating points for an engine to warm the exhaust and thus the reformer. This process generally takes place after the engine and the rest of the exhaust system have completed their initial warm-up, e.g. ten or more minutes after the engine has been running continuously. The operating point selections designed to warm the reformer generally commence in response to an electronically generated command to start the reformer, which may be the result of a command to regenerate an aftertreatment device.

Figure 8:
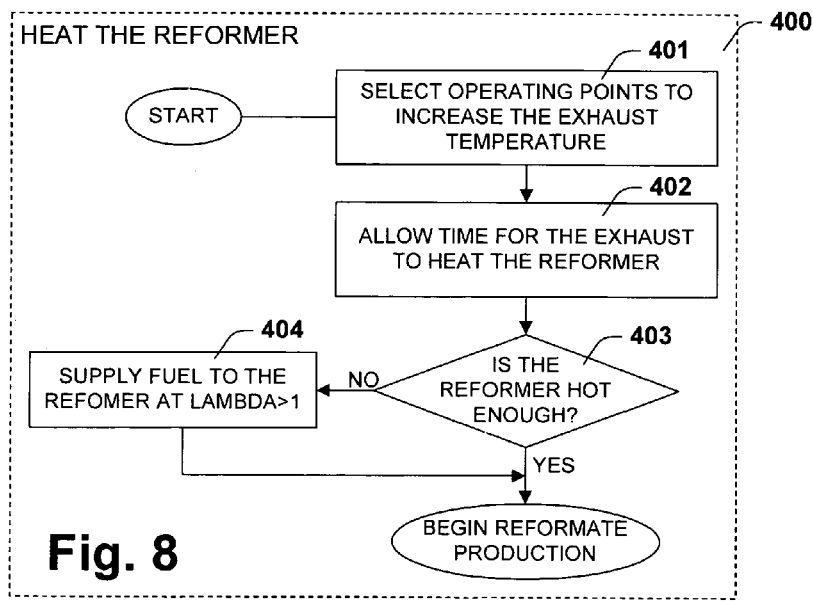
FIG. 8 is a flow chart of an exemplary method for heating a reformer.
Figure 9:
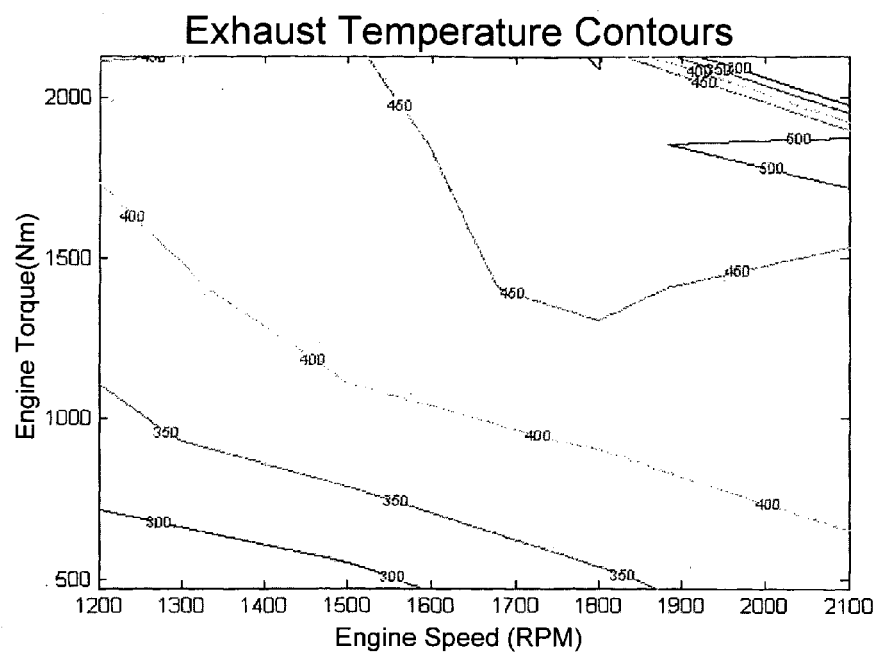
FIG. 9 is a plot of showing an exemplary variation of exhaust temperature with engine operating point.

FIG. 8 is a flow chart for a process 400 that implements the inventors' concept for starting the reformer 12. The process 400 begins in step 401, which is using the transmission 8 to select operating points for the engine 9 to produce a hotter exhaust. As illustrated by FIG. 9, there is generally a range of exhaust temperatures among operating points producing a given power level. By selecting an appropriate operating point, an exhaust temperature can be increased without affecting the engine power output. Depending on various factors including the staring point and the power level, in some cases the reformer 12 can be heated by, for example, at least about 40° C. by the shift in operating point section. In a narrower group of cases, the reformer 12 can be heated by at least about 80° C. through the operation of the transmission 8. The operating point selection is preferably based on the exhaust temperature downstream of the turbine, as opposed to upstream of the turbine. As in the case of selecting an operating point for enhancing the efficiency of the LNT 14, various constraints and biases may be included in an operating point selection designed to increase the exhaust temperature to facilitate reformer start-up. The operating point can be selected dynamically, or determined in advance and encoded in an operating point map.

In step 402, the engine 9 is operated for a period of time with operating points selected to increase the exhaust temperature. The exact operating point may vary over the period in response to changes in engine power demand. High exhaust temperature operation is typically maintained for a period from about 0.5 to about 10 seconds preferably from about 1 to about 5 seconds. During this time, the reformer 12 warms. The thermal mass of the reformer 12 generally limits the warm-up rate. Preferably, the reformer 12 has nearly the minimal thermal mass determined by its functional requirements.

After the reformer 12 has been warmed by the exhaust, it may still be below a temperature at which it can effectively operate with a rich fuel-oxygen mixture (lambda less than 1.0). If so, in step 403, the fuel injector 11 is actuated to initiate fuel injection at a rate that leaves the exhaust lean (lambda greater than 1.0). The fuel burns in the reformer 12, further heating the reformer 12. A typical objective is to heat the reformer to at least about 500° C., preferably at least about 600° C., and still more preferably at least about 650° C.

Once the reformer is heated to a satisfactory degree, the feed to the reformer is made rich in step 106, whereupon the reformer 12 begins to produce reformate and denitration or desulfation of the LNT 14 begins. The feed can be made rich by any suitable combination of fuel injection, engine intake air throttling (where provided for), and exhaust gas recirculation (EGR). The operating point of the engine may also be adjusted to assist in making the feed rich, as discussed more fully below.

During rich operation, substantially all the oxygen present in the exhaust is consumed while producing reformate. Regardless of the actual sequence of reactions, the operation of the reformer can be modeled by the following $$0.684 CH_{1.85} + O_2 \rightarrow 0.684 CO_2 + 0.632 H_2O \qquad (8)$$

$$0.316 CH_{1.85} + 0.316 H_2O \rightarrow 0.316 CO + 0.608 H_2 \qquad (9)$$

$$0.316 CO + 0.316 H_2O \rightarrow 0.316 CO_2 + 0.316 H_2 \qquad (10)$$

wherein $CH_{1.85}$ represents diesel fuel with a 1.85 ratio between carbon and hydrogen. Equation (8) is exothermic complete combustion which consumes all the excess oxygen in the exhaust. Equation (9) is endothermic steam reforming. Equation (10) is the water gas shift reaction, which is relatively thermal neutral and is not of great importance in the present disclosure, as both CO and $H_2$ are effective for regeneration.

In an ideal situation, the extents of Equations (8) and (9) are balanced whereby the reformer temperature remains constant, or that failing, Equation (9) dominates and the reformer cools while large quantities of reformate are produced. When the oxygen concentration is relatively low, e.g., 5–10% or less, depending on the reformer, this ideal can be approached. At higher oxygen concentrations, however, it has generally been observed that the endothermic reforming rate cannot be matched to the combustion rate. The result is that reformate production efficiency falls off and the reformer 12 heats uncontrollably. Eventually, the reformer must be shutdown to prevent it, or downstream devices, from over heating. Thus, the reformer 12 tends to be unstable at high oxygen concentrations.

Addressing these issues, one of the inventors' concepts is to use a transmission to shift an engine operating point in order to reduce an exhaust oxygen concentration during operation of a fuel reformer drawing oxygen from the exhaust. The shift in operating point preferably brings the oxygen into a range wherein the reformer can be operated to consume excess oxygen and produce reformate while remaining at a constant temperature. The preferred oxygen concentration will depend on the reformer catalyst and other factors, however, in general the preferred oxygen concentration will be less than about 10%, more typically less than about 8%.

Figure 10:
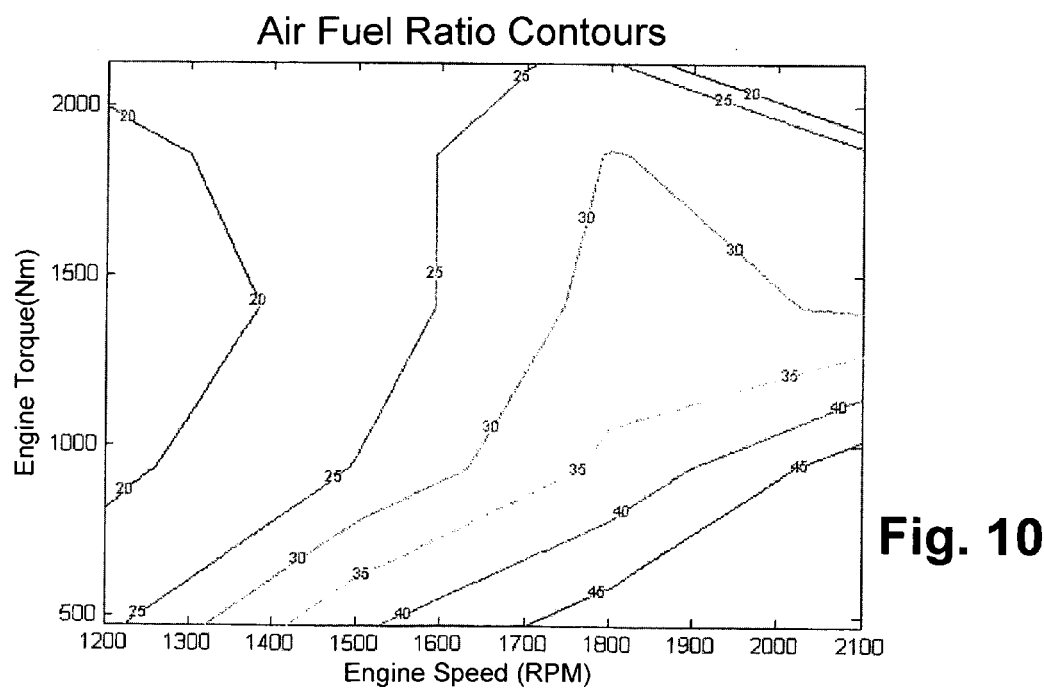
FIG. 10 is a plot of showing an exemplary variation of engine air-fuel ratio with engine operating point.

FIG. 10 is an exemplary plot of air-fuel ratio as a function of operating point. Several curves of constant power level operation are shown. While the exhaust oxygen concentration also depends on other factors, exhaust oxygen concentration is a strong function of engine air-fuel ratio. FIG. 10 illustrates that while the exact relationship between oxygen concentration and operating point can be complex, it is general possible to influence the oxygen concentration significantly through selection of engine operating points.

The inventors recognize that reducing the oxygen concentration during regeneration can be beneficial even when a reformer is not used. In general, if regeneration of an aftertreatment device requires a reducing atmosphere, fuel or reductant must be consumed removing excess oxygen. Accordingly, one of the inventors' concepts is to select engine operating points to reduce the oxygen concentration in the engine's exhaust during regeneration of an exhaust aftertreatment device. This concept is generally useful for reducing the fuel penalty associated with the regeneration of an aftertreatment device, such as an LNT.

While reducing the oxygen concentration in the exhaust can have other benefits, the main objective is often to reduce fuel penalty. The oxygen concentration in the exhaust can be a primary factor in determining the fuel penalty for a regeneration, but other factors can also be important. For example, the exhaust flow rate may also be important due to its effect on reductant slip. The break specific fuel consumption of the engine will also change with operating point and may outweigh the benefits of reducing the oxygen concentration beyond a certain degree.

Therefore, another of the inventors' concepts is to use a transmission to select operating points for an engine during regeneration of an aftertreatment device in order to reduce a fuel penalty. The term regeneration is generally inclusive of denitration and desulfation. In general, the fuel penalty will include a contribution associated with consuming excess oxygen in the exhaust. In one embodiment, the fuel penalty includes a contribution relating to the cost of operating the engine 9 at operating points apart from its minimum brake-specific fuel consumption operating point. In another embodiment, the fuel penalty includes a contribution relating to reductant slip during regeneration. A preferred method of selecting operating points chooses operating points that maximizes an objective function, wherein the objective function is proportional to the time that will be required to complete the regeneration under current conditions times the sum of the oxygen consumption fuel penalty rate and the fuel penalty rate associated with operating the engine at a BSFC above the minimum BSFC for the current power level.

Regardless of the exhaust composition and flow rate, it is expected that the incremental fuel penalty will increase over the course of regeneration. The fuel penalty increases due to decreasing concentration of the contaminant being removed. As the contaminant concentration decreases, a progressively greater fraction of the reductant is lost to reductant slip. This phenomenon can be used to detect the endpoint of a regeneration. The extent of regeneration is indicated by the reductant slip, which can be measured, for example, by a lambda sensor. In interpreting the sensor reading, a calculation is preferably made to take into account the effects of other conditions, such as the LNT temperature, and including at least the current exhaust flow rate.

An ideal endpoint for a LNT regeneration involves a tradeoff between such factors as the required LNT efficiency, penalties that increase with regeneration frequency, such as a startup fuel penalty, and the variation of fuel penalty with extent of regeneration. The inventors recognize that the point of optimal trade-off varies with the operating state of the engine and with the degree of poisoning of the LNT. Accordingly, one of the inventors' concepts is to vary the endpoint of a denitration or a desulfation whereby the regeneration is more extensive when the engine is in an operating state requiring higher LNT efficiency. Another concept is to regenerate to a further extent when the LNT is poisoned to a greater extent by factors not affect by the regeneration. With respect to desulfation, the factors can be irreversible poisoning or other irreversible loss of activity. With respect to denitration, the factors can be to irreversible loss of activity or reversible sulfur poisoning.

The process 200 provides an example where the extent of denitration is determined in a manner that depends on both extents of poisoning and on engine operating mode. The extent determined in process 200 is implemented in step 106, where the denitration is performed.

Figure 11:
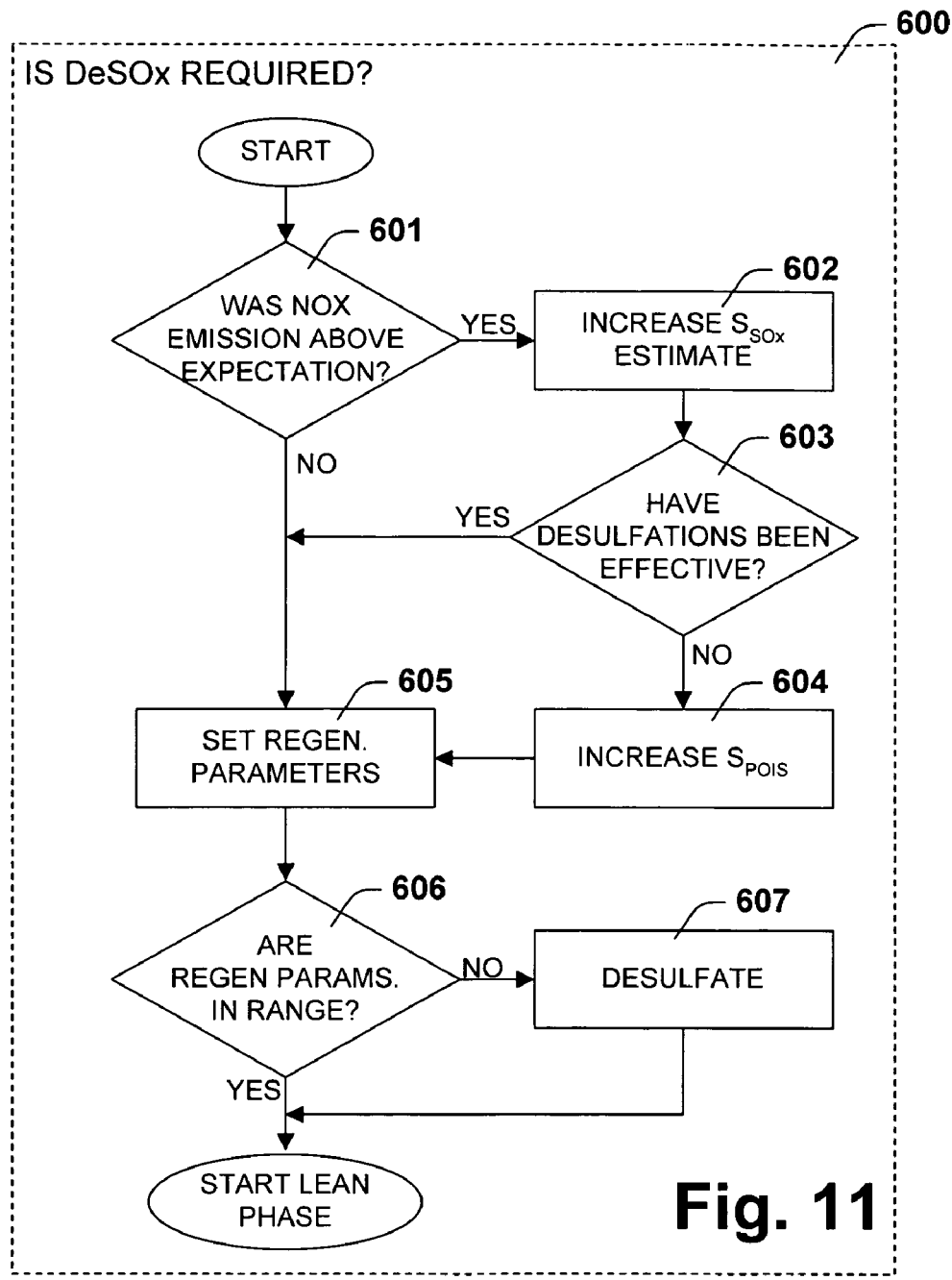
FIG. 11 is a flow chart of an exemplary method for determining whether to initiate a desulfation.

After denitration, step 107 checks whether desulfation is required. FIG. 11 is a flow chart of an exemplary method 600, which may be implemented in step 107 for determining whether to desulfate. The method 600 begins with step 601, determining whether the NOx emission level at the end of the previous lean phase was above expectation, expectation being a value predicted by the model used in the method 200. The prediction is made before correcting $S_{NOx}$ to account for the difference, as described in method 300. If the NOx emission level was above expectation, the estimate of $S_{SOx}$ is increased in step 602. The amount of the increase can be an amount that would explain the difference between the observed NOx emission and the predicted NOx emission, however it is preferred that the increase be some fraction of that amount, e.g., 25%, whereby the estimate of $S_{SOx}$ changes slowly.

Step 603 uses the pattern of change in $S_{SOx}$ to evaluate whether the LNT 14 has become irreversibly poisoned. In particular, if $S_{SOx}$ increases rapidly following a desulfation, or following each of the last several desulfations, this can be taken as an indication that desulfation is not as effective as anticipated, which in turn can be treated as an indication of irreversible loss of activity. If the pattern indicates the LNT 14 has become irreversibly poisoned, the estimate for $S_{POIS}$ is increased by an appropriate amount in step 604.

Step 605 uses process 200 to obtain new values for the regeneration parameters, period and duration. Step 606 determines whether parameters meeting the constraints were found in step 605, and if they were found whether they give satisfactory performance for the aftertreatment system 7 in terms of an appropriate performance measure, such as fuel penalty or period between denitrations. If the constraints could not be met or the performance of the aftertreatment system 7 using the parameters determined in step 605 is not acceptable, then a desulfation is commenced in step 607. Because the parameter determination in step 605 depends on the engine operating state and the degree or irreversible poisoning of the LNT 14, the method 600 is an example of a method in which the time to commence desulfation depends on engine operating state and the degree or irreversible poisoning.

Figure 12:
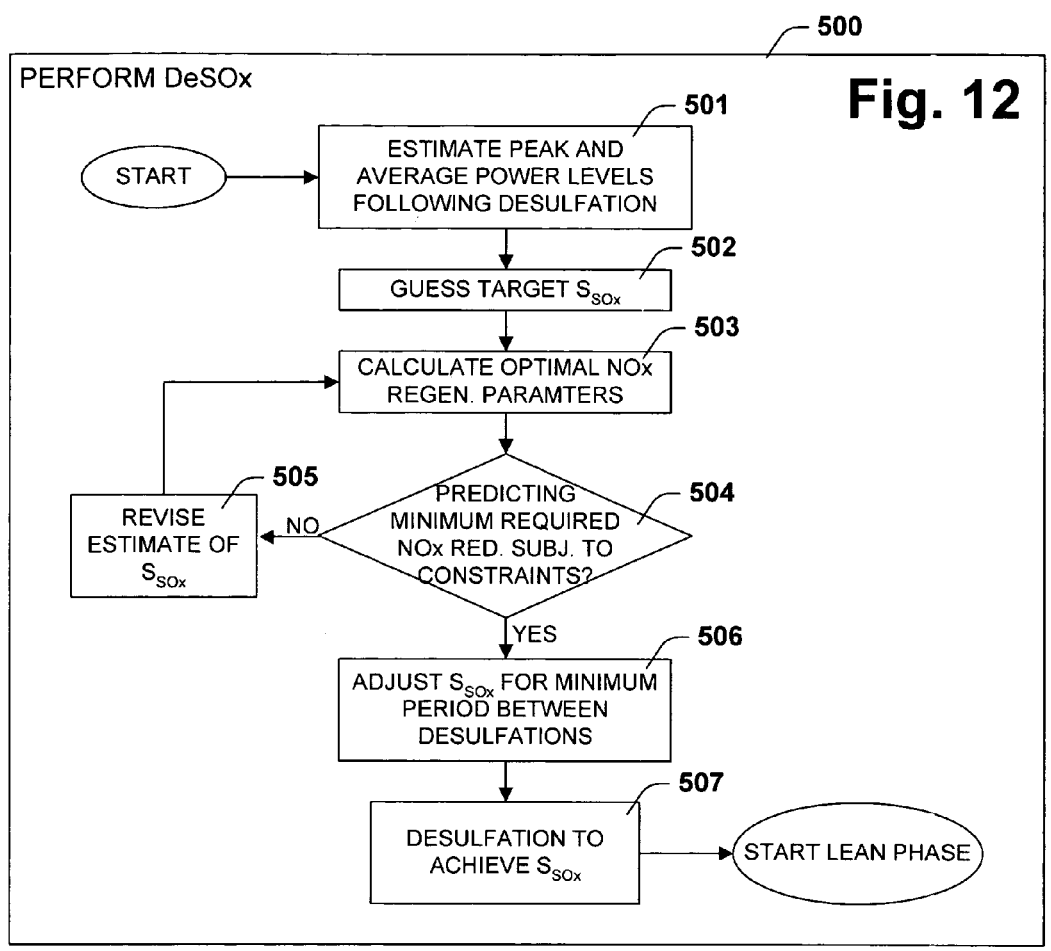
FIG. 12 is a flow chart of an exemplary method of desulfating an LNT.

The extent of desulfation also preferably depends on engine operating state and/or the degree or irreversible poisoning. FIG. 12 is a flow chart of a method 500 in which the extent of desulfation depends on the engine operating state. The method 500 begins with step 501, estimating peak and average power levels for the period following the desulfation. This is similar to step 201 of the method 200, except in this case the estimates relate to a more extended period. The higher the peak and average power levels, the greater the degree of desulfation that will be required.

The next few steps provide an iterative method for determining the required degree of desulfation. The required degree of desulfation will provide the aftertreatment, system 7 with sufficient activity to meet an emission control target under the current operating condition. Step 502 is guessing the target sulfur saturation level. Step 503 is calculating optimal denitration parameters assuming the target sulfur saturation. Step 504 determines whether the aftertreatment system 7 provides the minimum required performance at the target sulfur saturation assuming the optimal NOx regeneration parameters are used. Step 505 is used to revise the target sulfur saturation until convergence is reached.

Step 506 makes an adjustment to the target sulfur saturation to provide an interval between desulfations. The adjustment could involve a fixed additional amount of sulfur removal or a target time between desulfation. A target time between desulfations could be, for example, about 10 or about 30 hours. The adjustment to the target sulfur saturation is made by estimating the amount of additional sulfur removal that would give the target interval. This involves estimating the rate at which the LNT 12 accumulates sulfur under current conditions.

Step 507 is carrying out the desulfation. The progress of desulfation can be determined in any suitable fashion. In one embodiment, a model for the desulfation reactions is used to estimate how much desulfation has occurred. In another embodiment, a sensor is used to monitor the concentration of $SO_2$ downstream of the oxidation catalyst 17. The measure concentrations can be integrated to determine the total amount of sulfur removal.

As discussed previously, the foregoing methods are most effective in extending LNT life and improving fuel economy when applied to an engine that can operate efficiently in a low speed range through most of its operating cycle. This is true of most diesel engines, although a CVT is generally needed to track on of the optimal fuel economy curves plotted in FIG. 3.

Efficiency can be further improved if the engine can be efficiently operated in a narrow and preferably low speed range throughout its power range, as illustrated in FIG. 3. An engine that lends itself to such operation can be produced by a typical engine manufacturer given the objective of narrow speed range operation. The manufacturer has the ability to modify parameters such as the turbocharger operation, the fuel system characteristics, the cam shaft shape, and the electronic controls in order to make the engine's peak efficiency occur within a narrow speed range throughout its operating power range. A CVT could then be used to always keep the engine at operating points within a narrow speed range and near the peak fuel economy curve, excepting perhaps for special circumstances such as provided by some of the foregoing methods. Preferably, the engine has a peak fuel economy curve with a speed range of about 300 RPM or less, more preferably about 200 RPM or less, and still more preferably about 100 RPM or less. A preferred power generation system includes a narrow speed range engine, a CVT, and an aftertreatment system, which may be any conventional aftertreatment system or the aftertreatment system 7. For any aftertreatment system design, the narrow speed range, and the consequently narrowly varying exhaust flow rate, reduce the system requirements and simplify reductant dosing.

In one embodiment, a narrow speed range power generation system is used to reduce the catalyst loading, especially of a precious metal catalyst, in the aftertreatment system. Preferably, the power generation system 5 comprises an aftertreatment system 7 comprising a component with at least about 10% less catalyst than a comparable component in a comparable aftertreatment system of a power generation system using a conventional engine and transmission and having the same brake-specific NOx emission rate. More preferably, the component comprises at least about 20% less catalyst, and still more preferably at least about 30% less catalyst.

While the engine 9 is preferably a compression ignition diesel engine, the various concepts of the invention are applicable to power generation systems with lean-burn gasoline engines or any other type of engine that produces an oxygen rich, NOx-containing exhaust. For purposes of the present disclosure, NOx consists of NO and $NO_2$.

The transmission 8 can be any suitable type of automatic transmission. The transmission 8 can be a conventional transmission such as a counter-shaft type mechanical transmission, but is preferably a CVT. A CVT can provide a much larger selection of operating points than a conventional transmission and generally also provides a broader range of torque multipliers. In general, a CVT will also avoid or minimize interruptions in power transmission during shifting. Examples of CVT systems include hydrostatic transmissions; rolling contact traction drives; overrunning clutch designs; electrics; multispeed gear boxes with slipping clutches; and V-belt traction drives. A CVT may involve power splitting and may also include a multi-step transmission.

A preferred CVT provides a wide range of torque multiplication ratios, reduces the need for shifting in comparison to a conventional transmission, and subjects the CVT to only a fraction of the peak torque levels produced by the engine. This can be achieved using a step-down gear set to reduce the torque passing through the CVT. Torque from the CVT passes through a step-up gear set that restores the torque.

The CVT is further protected by splitting the torque from the engine, and recombining the torque in a planetary gear set. The planetary gear set mixes or combines a direct torque element transmitted from the engine through a stepped automatic transmission with a torque element from a CVT, such as a band-type CVT. The combination provides an overall CVT in which only a portion of the torque passes through the band-type CVT.

The fuel injector 11 can be of any suitable type. It can inject the fuel co-current, cross-current, or counter-current to the exhaust flow. Preferably, it provides the fuel in an atomized or vaporized spray. The fuel may be injected at the pressure provided by a fuel pump for the engine 9. Preferably, however, the fuel passes through a pressure intensifier operating on hydraulic principles to at least double the fuel pressure from that provided by the fuel pump to provide the fuel at a pressure of at least about 4 bar.

The lean-NOx catalyst 15 can be either an HC-SCR catalyst, a CO-SCR catalyst, or a $H_2$-SCR catalyst. Examples of HC-SCR catalysts include transitional metals loaded on refractory oxides or exchanged into zeolites. Examples of transition metals include copper, chromium, iron, cobalt, nickel, cadmium, silver, gold, iridium, platinum and manganese, and mixtures thereof. Exemplary of refractory oxides include alumina, zirconia, silica-alumina, and titania. Useful zeolites include ZSM-5, Y zeolites, Mordenite, and Ferrerite. Preferred zeolites have Si:Al ratios greater than about 5, optionally greater than about 20. Specific examples of zeolite-based HC-SCR catalysts include Cu-ZSM-5, Fe-ZSM-5, and Co-ZSM-5. A $CeO_2$ coating may reduce water and $SO_2$ deactivation of these catalysts. Cu/ZSM-5 is effective in the temperature range from about 300 to about 450° C. Specific examples of refractory oxide-based catalysts include alumina-supported silver. Two or more catalysts can be combined to extend the effective temperature window.

Where a hydrocarbon-storing function is desired, zeolites can be effective. U.S. Pat. No. 6,202,407 describes HC-SCR catalysts that have a hydrocarbon storing function. The catalysts are amphoteric metal oxides. The metal oxides are amphoteric in the sense of showing reactivity with both acids and bases. Specific examples include gamma-alumina, $Ga_2O_3$, and $ZrO_2$. Precious metals are optional. Where precious metals are used, the less expensive precious metals such as Cu, Ni, or Sn can be used instead of Pt, Pd, or Rh.

In the present disclosure, the term hydrocarbon is inclusive of all species consisting essentially of hydrogen and carbon atoms, however, a HC-SCR catalyst does not need to show activity with respect to every hydrocarbon molecule. For example, some HC-SCR catalysts will be better adapted to utilizing short-chain hydrocarbons and HC-SCR catalysts in general are not expected to show substantial activity with respect to $CH_4$.

Examples of CO-SCR catalysts include precious metals on refractory oxide supports. Specific examples include Rh on a $CeO_2$—$ZrO_2$ support and Cu and/or Fe $ZrO_2$ support.

Examples of $H_2$-SCR catalysts also include precious metals on refractory oxide supports. Specific examples include Pt supported on mixed $LaMnO_3$, $CeO_2$, and $MnO_2$, Pt supported on mixed $ZiO_2$ and $TiO_2$, Ru supported on MgO, and Ru supported on $Al_2O_3$.

The lean-NOx catalyst 15 can be positioned differently from illustrated in FIG. 1. In one embodiment, the lean NOx catalyst 15 is upstream of the fuel injector 11. In another embodiment the lean NOx catalyst is downstream of the reformer 12, whereby the lean NOx catalyst 15 can use reformer products as reductants. In a further embodiment, the lean NOx catalyst 15 is well downstream of the LNT 14, whereby the lean NOx catalyst 15 can be protected from high temperatures associated with desulfating the LNT 14.

A fuel reformer is a device that converts heavier fuels into lighter compounds without fully combusting the fuel. A fuel reformer can be a catalytic reformer or a plasma reformer. Preferably, the reformer 12 is a partial oxidation catalytic reformer. A partial oxidation catalytic reformer comprises a reformer catalyst. Examples of reformer catalysts include precious metals, such as Pt, Pd, or Ru, and oxides of Al, Mg, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 500° C. A partial oxidation catalytic reformer is generally operative at temperatures from about 600 to about 1100° C.

The NOx adsorber-catalyst 14 can comprise any suitable NOx-adsorbing material. Examples of NOx adsorbing materials include oxides, carbonates, and hydroxides of alkaline earth metals such as Mg, Ca, Sr, and Be or alkali metals such as K or Ce. Further examples of NOx-adsorbing materials include molecular sieves, such as zeolites, alumina, silica, and activated carbon. Still further examples include metal phosphates, such as phosphates of titanium and zirconium. Generally, the NOx-adsorbing material is an alkaline earth oxide. The adsorbant is typically combined with a binder and either formed into a self-supporting structure or applied as a coating over an inert substrate.

The LNT 14 also comprises a catalyst for the reduction of NOx in a reducing environment. The catalyst can be, for example, one or more precious metals, such as Au, Ag, and Cu, group VIII metals, such as Pt, Pd, Ru, Ni, and Co, Cr, Mo, or K. A typical catalyst includes Pt and Rh, although it may be desirable to reduce or eliminate the Rh to favor the production of $NH_3$ over $N_2$. Precious metal catalysts also facilitate the adsorbant function of alkaline earth oxide adsorbers.

Adsorbant and catalysts according to the present invention are generally adapted for use in vehicle exhaust systems. Vehicle exhaust systems create restriction on weight, dimensions, and durability. For example, a NOx adsorbant bed for a vehicle exhaust systems must be reasonably resistant to degradation under the vibrations encountered during vehicle operation.

An adsorbant bed or catalyst brick can have any suitable structure. Examples of suitable structures may include monoliths, packed beds, and layered screening. A packed bed is preferably formed into a cohesive mass by sintering the particles or adhering them with a binder. When the bed has an adsorbant function, preferably any thick walls, large particles, or thick coatings have a macro-porous structure facilitating access to micro-pores where adsorption occurs. A macro-porous structure can be developed by forming the walls, particles, or coatings from small particles of adsorbant sintered together or held together with a binder.

The ammonia-SCR catalyst 16 is a catalyst effective to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substituted with metal ions such as cations of Cu, Co, Ag, Zn, or Pt, and activated carbon. Preferably, the ammonia-SCR catalyst 16 is designed to tolerate temperatures required to desulfate the LNT 14.

The particulate filter 13 can have any suitable structure. Examples of suitable structures include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers. Typical pore sizes for the filter elements are about 10 µm or less. Optionally, one or more of the LNT 14, the lean-NOx catalyst 15, or the ammonia-SCR catalyst 16 is integrated as a coating on the DPF 13.

The DPF 13 is regenerated to remove accumulated soot. The DPF 13 can be of the type that is regenerated continuously or intermittently. For intermittent regeneration, the DFP 13 is heated, using a reformer 12 for example. The DPF 13 is heated to a temperature at which accumulated soot combusts with $O_2$. This temperature can be lowered by providing the DPF 13 with a suitable catalyst. After the DPF 13 is heated, soot is combusted in an oxygen rich environment.

For continuous regeneration, the DPF 13 may be provided with a catalyst that promotes combustion of soot by both $NO_2$ and $O_2$. Examples of catalysts that promote the oxidation of soot by both $NO_2$ and $O_2$ include oxides of Ce, Zr, La, Y, and Nd. To completely eliminate the need for intermittent regeneration, it may be necessary to provide an additional oxidation catalyst to promote the oxidation of NO to $NO_2$ and thereby provide sufficient $NO_2$ to combust soot as quickly as it accumulates. Where regeneration is continuous, the DPF 13 is suitably placed upstream of the reformer 12. Where the DPF 13 is not continuously regenerated, it is generally positioned as illustrated in FIG. 1 or a point downstream. An advantage of the position illustrated in FIG. 1 is that the DPF 13 buffers the temperature between the reformer 12 and the LNT 14.

The clean-up catalyst 17 is preferably functional to oxidize unburned hydrocarbons from the engine 9, unused reductants, and any $H_2S$ released from the NOx adsorber-catalyst 13 and not oxidized by the ammonia-SCR catalyst 15. Any suitable oxidation catalyst can be used. A typical oxidation catalyst is a precious metal, such as platinum. To allow the clean-up catalyst 17 to function under rich conditions, the catalyst may include an oxygen-storing component, such as ceria. Removal of $H_2S$, where required, may be facilitated by one or more additional components such as NiO, $Fe_2O3$, $MnO_2$, CoO, and $CrO_2$.

The invention as delineated by the following claims has been shown and/or described in terms of certain concepts, components, and features. While a particular component or feature, may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A vehicle, comprising:
   one or more axles;
   a compression ignition diesel engine;
   a continuously variable transmission configured to transmit power from the engine to the axle(s); and
   an exhaust aftertreatment system configured to treat exhaust from the engine;

wherein substantially all of the vehicle's power is produced by the compression ignition diesel engine; and
the engine and transmission are configured whereby the engine always operates within a speed range spanning no more than about 300 RPM over all the engine's levels of power output.

2. The vehicle of claim 1, wherein the speed range is below about 1600 RPM.

3. The vehicle of claim 1, wherein the exhaust aftertreatment system comprises a NOx adsorber-catalyst and maintenance of the engine within a relatively narrow speed substantially reduces the amount of catalyst required by the NOx adsorber-catalyst to achieve a given degree of NOx removal when compared against engines of equivalent power rating operating with a substantially more widely varying speed range.

4. The vehicle of claim 3, wherein the exhaust treatment system further comprises an ammonia SCR catalyst.

5. The vehicle of claim 1, wherein the exhaust aftertreatment system comprises a particulate filter and maintenance of the engine within a relatively narrow speed substantially reduces the required size of the particulate filter to remain within a given limit to exhaust back-pressure when compared against engines of equivalent power rating operating with a substantially more widely varying speed range.

6. The vehicle of claim 1, wherein the exhaust aftertreatment system comprises an SCR reactor and an ammonia source and maintenance of the engine within a relatively narrow speed range facilitates dosing of ammonia to reduce NOx in the exhaust by reaction with ammonia in the SCR reactor when compared against engines of equivalent power rating operating with a substantially more widely varying speed range.

7. The vehicle of claim 1, wherein the compression ignition diesel engine is designed to operate with peak fuel economy within the speed range spanning no more than about 300 RPM at all the engine's possible levels of power output.

8. The vehicle of claim 1, wherein the flow rate of the exhaust from the engine remains within a narrow range throughout the engine's operation.

9. A method of operating an exhaust aftertreatment system for a vehicle, comprising:
removing NOx from the vehicle's engine exhaust using an aftertreatment system comprising a NOx adsorber-catalyst;
from time-to-time, regenerating to remove NOx from the NOx adsorber-catalyst; and
from time-to-time, regenerating to remove SOx from the NOx adsorber-catalyst;
wherein one or more parameters for one or both types of regeneration varies, whereby the saturation of NOx and/or SOx to which the NOx adsorber-catalyst is reduced by regeneration is lower when an operating state makes the NOx adsorber-catalyst otherwise less effective or places a greater demand for conversion efficiency on the NOx adsorber-catalyst;
wherein the operating state relates to one of a vehicle operating mode, a degree of irreversible poisoning or loss of activity in the NOx adsorber-catalyst, a temperature of the NOx adsorber-catalyst.

10. The method of claim 9, wherein:
the operating state is a vehicle operating mode;
the vehicle comprises a CVT coupled to the engine;
the CVT is controlled to keep the engine in a low speed range for all but the highest levels of power demand.

11. The method of claim 10, wherein the operating state relates primarily to a requirement for engine power.

12. The method of claim 9, wherein the exhaust aftertreatment system further comprises a SCR catalyst.

13. The method of claim 9, wherein the operating state relates to a degree of irreversible poisoning or loss of activity in the NOx adsorber-catalyst.

14. The method of claim 9, wherein the operating state relates to a temperature of the NOx adsorber-catalyst, whereby the saturation of NOx and/or SOx in the NOx adsorber-catalyst is reduced to a lower level if regeneration takes place near a limit of the NOx adsorber-catalyst's effective operating temperature range.

15. The method of claim 9, wherein the saturation of NOx in the NOx adsorber-catalyst is reduced to a lower level when an operating state makes the NOx adsorber-catalyst otherwise less effective or places a greater demand for conversion efficiency on the NOx adsorber-catalyst.

16. The method of claim 9, wherein the saturation of SOx in the NOx adsorber-catalyst is reduced to a lower level when an operating state makes the NOx adsorber-catalyst otherwise less effective or places a greater demand for conversion efficiency on the NOx adsorber-catalyst.

17. The method of claim 9, wherein one or more of the parameters are varied whereby the saturation of NOx in the NOx adsorber-catalyst is reduced to a level that depends on the degree of SOx saturation.

18. A method of operating an exhaust aftertreatment system for a vehicle, comprising:
removing NOx from the engine exhaust using an exhaust aftertreatment system comprising a NOx adsorber-catalyst;
from time-to-time, denitrating the NOx adsorber-catalyst;
from time-to-time, desulfating the NOx adsorber-catalyst;
desulfating according to a first criteria when engine power demands are not in a peak range;
desulfating according to a second, more stringent criteria, when engine power demands are in a peak range;
whereby a degree of sulfur poisoning that remains at the end of a desulfation is lower when engine power demands are in a peak range than it is otherwise.

19. A vehicle comprising:
one or more axles;
a compression ignition diesel engine;
a continuously variable transmission (CVT) configured to transmit power from the engine to the axle(s);
an exhaust aftertreatment system configured to treat exhaust from the engine; and
controllers for the engine, the CVT, and the exhaust aftertreatment system;
wherein the controllers are configured to implement the method of claim 18.

* * * * *